United States Patent [19]

Brulard

[11] Patent Number: 4,555,652
[45] Date of Patent: Nov. 26, 1985

[54] CONTROL CIRCUIT FOR OPERATING A DIRECT CURRENT MOTOR DURING TRACTION OR BRAKING

[75] Inventor: Michel C. Brulard, Clamart, France

[73] Assignee: Jeumont-Schneider Corporation, France

[21] Appl. No.: 313,641

[22] Filed: Oct. 22, 1981

[30] Foreign Application Priority Data

Oct. 30, 1980 [FR] France ................ 80 23209

[51] Int. Cl.⁴ ............................. H02P 3/12
[52] U.S. Cl. .................... 318/375; 318/376; 318/380; 318/514
[58] Field of Search .......... 318/362, 375, 376, 380, 318/379, 381, 261, 269, 273, 345 C, 345 G, 357, 358, 350, 514, 493, 508, 509, 60, 370, 63, 86–88, 89, 138, 757–760, 534, 439

[56] References Cited

U.S. PATENT DOCUMENTS

| | | | |
|---|---|---|---|
| 3,299,338 | 1/1967 | Torii | 318/249 |
| 4,216,420 | 8/1980 | Jinbo et al. | 318/376 X |
| 4,236,103 | 11/1980 | Matthey et al. | 318/514 X |
| 4,322,667 | 3/1982 | Ohba | 318/493 X |
| 4,326,154 | 4/1982 | Lewis et al. | 318/376 |
| 4,352,049 | 9/1982 | Franz | 318/370 |
| 4,423,363 | 12/1983 | Clark et al. | 318/375 |

FOREIGN PATENT DOCUMENTS

| | | |
|---|---|---|
| 2343359 | 9/1977 | France . |
| 2399155 | 2/1979 | France . |
| 2335995 | 2/1980 | France . |

OTHER PUBLICATIONS

Proceedings of IEEE, p. 122, Feb. 1949.

*Primary Examiner*—Ulysses Weldon
*Attorney, Agent, or Firm*—Rines and Rines, Shapiro and Shapiro

[57] ABSTRACT

A control circuit which permits a direct current motor to operate during traction or during braking in such a manner that energy can be either dissipated or recovered; and, in particular, the invention embodies gradual, continuous, and reversible shifting from one form of braking action to another.

1 Claim, 1 Drawing Figure

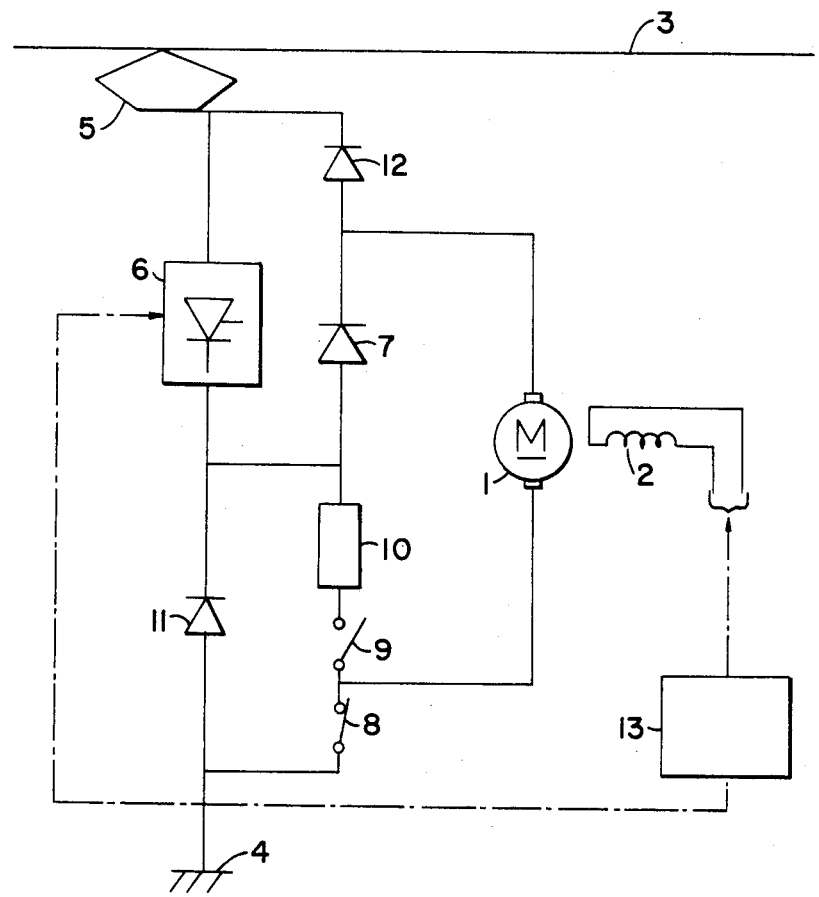

CONTROL CIRCUIT FOR OPERATING A DIRECT CURRENT MOTOR DURING TRACTION OR BRAKING

The present invention pertains to a control circuit for direct current motors, notably motors which are intended for railway traction. In particular, a control circuit of this type can permit operation of such a motor during traction or during braking, in such a manner that energy can be dissipated or recovered. This type of control circuit has been described in French patent Nos. 2,335,995, 2,343,359, and 2,399,155, for example. Previously developed control circuits of this type are characterized by the difficulty of not permitting a resumption of braking action by recovery of energy when braking action by dissipation of energy has begun, even though suitable conditions for recovering energy may have emerged in the meantime.

An object of the present invention is to overcome this difficulty by means of a novel control circuit which can allow gradual, continuous, and reversible shifting from one type of braking action to another.

Other objects will be later delineated and pointed out in the appended claims.

In summary, the invention involves connecting an energy dispersal resistor for the control circuit, which includes a chopper in series with the motor while the motor is operating during braking action, and disconnecting the resistor while the motor is operating under traction. The type of braking can be changed by adjusting the intensity of the current which enters the aforementioned resistor. Specifically, between the power supply line and the ground, the control circuit consists of one branch which includes a chopper, wherein the anode of the principal thyristor is connected to the power supply line, and it also includes a diode whose cathode is connected to the cathode of the principal thyristor. The aforementioned chopper is shunted across a second branch which includes two additional diodes which are situated opposite the principal thyristor. In turn, the first diode is shunted across a third branch wherein the resistor for energy dispersal is series-connected to two circuit-breakers which operate in alternation. In turn, the direct current motor is connected between the junction point for the second and third diodes on the one hand, and the junction point for the two previously cited circuit-breakers on the other hand.

The present invention, along with other purposes, advantages, and characteristics of said invention, can be more clearly understood by reading the following description of a best mode of the invention, which is accompanied by an illustrative drawing.

BRIEF DESCRIPTION OF THE DRAWING

The sole FIGURE schematically illustrates a control circuit in accordance with the present invention.

In terms of this FIGURE, the direct current motor (1) is a motor of the type which is separately excited by means of an inductor (2). The control circuit is connected between the overhead power supply line (3) and the ground (4) by means of a pantograph (5) and the wheels of the railway traction vehicle. The term "ground" as herein employed is intended to mean any reference potential such as earth, chassis or the like.

During traction, the chopper (6) functions as a voltage reducer, and it furnishes power for the armature of the motor (1) through the diode identified as (7) and through the circuit-breaker (8) which is engaged in this instance.

During braking, the motor (1) must operate as a voltage generator. Consequently, one of the circuit-breakers (8) must be open, while the other circuit-breaker (9) must remain closed. There are two possible paths for the current, depending upon the type of braking being selected.

If it is necessary to recover energy, in other words, if voltage generated by the motor minus the voltage which exists at the resistor terminals (10) slightly exceeds voltage along the power supply line (3), the current shall then pass from ground (4) through a diode (11), the resistor (10), closed circuit-breaker (9), the motor (1), another diode (12), and the pantograph, before being recovered by the power supply line (3).

If energy must be dispersed, in other words, if the previously cited difference between voltages is less than voltage along the line identified as (3), the current shall flow within the loop consisting of the motor (1), the diode (12), the chopper (6), the energy dispersal resistor (10), and the closed circuit-breaker (9). The advantage which distinguishes this control circuit essentially consists of the fact that there can be a gradual, continuous, and reversible changeover from one type of braking action to another.

Indeed, voltage at the terminals for the energy dispersal resistor (10) varies in relation to the intensity of the current travelling through the resistor, and it is possible to adjust intensity by means of the chopper (6). In addition, the output voltage for the motor (1), when it is operating as a generator, can be adapted in relation to the excitation current being applied to the inductor (2).

Consequently, the power which is to be dissipated within the resistor (10) can be easily regulated, and the same is true of power being recovered by the line identified as (3). Accordingly, the control unit (13) permits adjustment of the current within the inductor on the one hand, and, on the other hand, adjustment of conduction time for the principal thyristor within the chopper (6).

Therefore, it is possible to provide both types of adjustment automatically, in relation to the actual voltage along the line identified as (3) and in relation to instantaneous changes in voltage, in such a way as to minimize dissipation of power within the resistor (10) and to optimize power recovery along the line (3) at any time.

For this reason, the control unit (13) is connected to a voltmeter which is not shown in the FIGURE, so that voltage along the power supply line (3) can be measured.

Although only one application of the invention has been described, it is obvious that modifications of the same type introduced by technically knowledgeable persons would not deviate from the context of this invention. For example, it would be appropriate for the circuit-breakers (8 and 9) to be of the solid state type, such as thyristors; and other modifications may also be adopted within the scope of the invention.

I claim:

1. A control circuit for operating from a power supply a separately excited direct current motor, as of the type used to drive railway traction vehicles, said circuit operating during traction and during regenerative and dynamic braking, said circuit including a chopper and energy dissipation resistor means, said chopper comprising thyristor means, said circuit being characterized in that a first branch of the circuit, connected between the power supply and ground, includes first diode means and said thyristor means, each having an anode and a cathode, the anode of the thyristor means being connected to said power supply and the cathode of said first diode means being connected to the cathode of said thyristor means, in that the thyristor means is shunted across a second branch of the circuit including a second and a third diode means, and in that the first diode means is shunted across a third branch of the circuit including said resistor means series-connected with two alternately closed circuit breakers, and in that said motor is connected between the junction point of said second and third diode means and the junction point of said two circuit breakers, one of said circuit breakers being closed during traction to connect said junction of said circuit breakers to ground and the other of said circuit breakers being closed during regenerative and dynamic braking to connect said resistor means in series with said motor.

* * * * *